United States Patent
Sugimoto

(10) Patent No.: US 10,356,255 B2
(45) Date of Patent: Jul. 16, 2019

(54) IMAGE PROCESSING APPARATUS, PROJECTION APPARATUS, IMAGE PROCESSING METHOD, PROJECTION METHOD, AND STORAGE MEDIUM

(71) Applicant: CANON KABUSHIKI KAISHA, Tokyo (JP)

(72) Inventor: Kousei Sugimoto, Atsugi (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/012,956

(22) Filed: Jun. 20, 2018

(65) Prior Publication Data
US 2018/0376010 A1    Dec. 27, 2018

(30) Foreign Application Priority Data
Jun. 22, 2017 (JP) ................................. 2017-122473

(51) Int. Cl.
H04N 1/00 (2006.01)
H04N 1/60 (2006.01)
H04N 9/31 (2006.01)

(52) U.S. Cl.
CPC ....... *H04N 1/00267* (2013.01); *H04N 1/6002* (2013.01); *H04N 1/6027* (2013.01); *H04N 1/6097* (2013.01); *H04N 9/3182* (2013.01); *H04N 9/3194* (2013.01)

(58) Field of Classification Search
USPC .......................................................... 358/1.9
See application file for complete search history.

(56) References Cited

U.S. PATENT DOCUMENTS

| 8,659,585 | B2* | 2/2014 | Hikosaka | H04N 9/3182 345/207 |
| 2002/0001044 | A1* | 1/2002 | Villamide | H04N 9/28 348/745 |
| 2014/0125659 | A1* | 5/2014 | Yoshida | G06T 15/506 345/419 |

FOREIGN PATENT DOCUMENTS

| JP | 2004-274268 A | 9/2004 |
| JP | 2007-334179 A | 12/2007 |

OTHER PUBLICATIONS

Takashi, Projector Display System Program and Display Method; Dec. 27, 2007, Machine Translated Japanese Patent Application Publication; JP 2007334179 Listed on IDS, All pages (Year: 2007).*

* cited by examiner

Primary Examiner — Ngon B Nguyen
(74) Attorney, Agent, or Firm — Cowan, Liebowitz & Latman, P.C.

(57) ABSTRACT

There is provided an image processing apparatus that outputs projection image data to a projection unit configured to display an image by projecting a projection image onto a print image at a projection plane. A first acquisition unit acquires image data. A second acquisition unit acquires parameters related to reflectances at a plurality of positions on the print image. A setting unit sets an offset value for performing offset adjustment of at least one color of the image at the projection plane. A correction unit configured to generate the projection image data by correcting a pixel value of a pixel in the image data based on the offset value and the parameter at a position in the print image that corresponds to the pixel.

20 Claims, 6 Drawing Sheets

| PRINT IMAGE DATA PD | | | PRINTOUT COEFFICIENT | | |
|---|---|---|---|---|---|
| R | G | B | R | G | B |
| 0 | 0 | 0 | 0.1 | 0.1 | 0.1 |
| 32 | 0 | 0 | 0.2 | 0.1 | 0.1 |
| ... | ... | ... | ... | ... | ... |
| 255 | 0 | 0 | 0.9 | 0.1 | 0.1 |
| 0 | 32 | 0 | 0.1 | 0.2 | 0.1 |
| ... | ... | ... | ... | ... | ... |
| 0 | 255 | 0 | 0.1 | 0.9 | 0.1 |
| ... | ... | ... | ... | ... | ... |

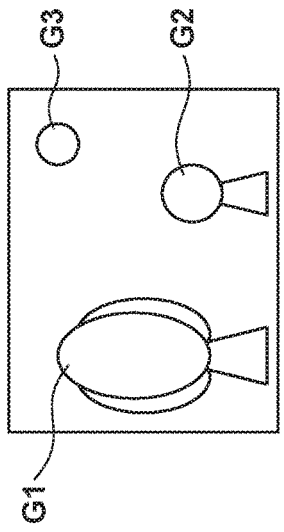
FIG. 5A
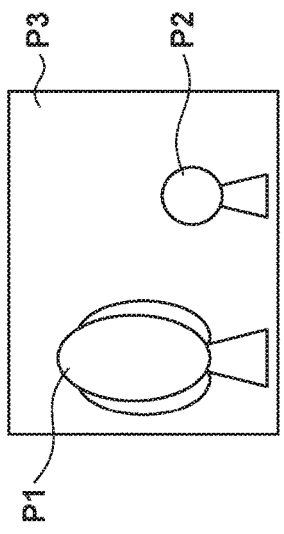
FIG. 5B
FIG. 6
| — | P1/G1 | | | P2/G2 | | | P3/G3 | | |
|---|---|---|---|---|---|---|---|---|---|
| | R | G | B | R | G | B | R | G | B |
| PRINT IMAGE DATA PD | 153 | 191 | 64 | 191 | 153 | 128 | 230 | 230 | 230 |
| PROJECTION IMAGE DATA GD | 153 | 191 | 64 | 191 | 153 | 128 | 230 | 0 | 0 |
| PRINTOUT COEFFICIENT | 0.60 | 0.75 | 0.25 | 0.75 | 0.60 | 0.50 | 1.00 | 1.00 | 1.00 |
| CORRECTION COEFFICIENT | 1.67 | 1.33 | 4.00 | 1.33 | 1.67 | 2.00 | 1.00 | 1.00 | 1.00 |
| CORRECTION ADJUSTMENT AMOUNT | 0 | 0 | 80 | 0 | 0 | 40 | 0 | 0 | 20 |
| PROJECTION IMAGE DATA DM | 153 | 191 | 144 | 191 | 153 | 168 | 230 | 230 | 250 |

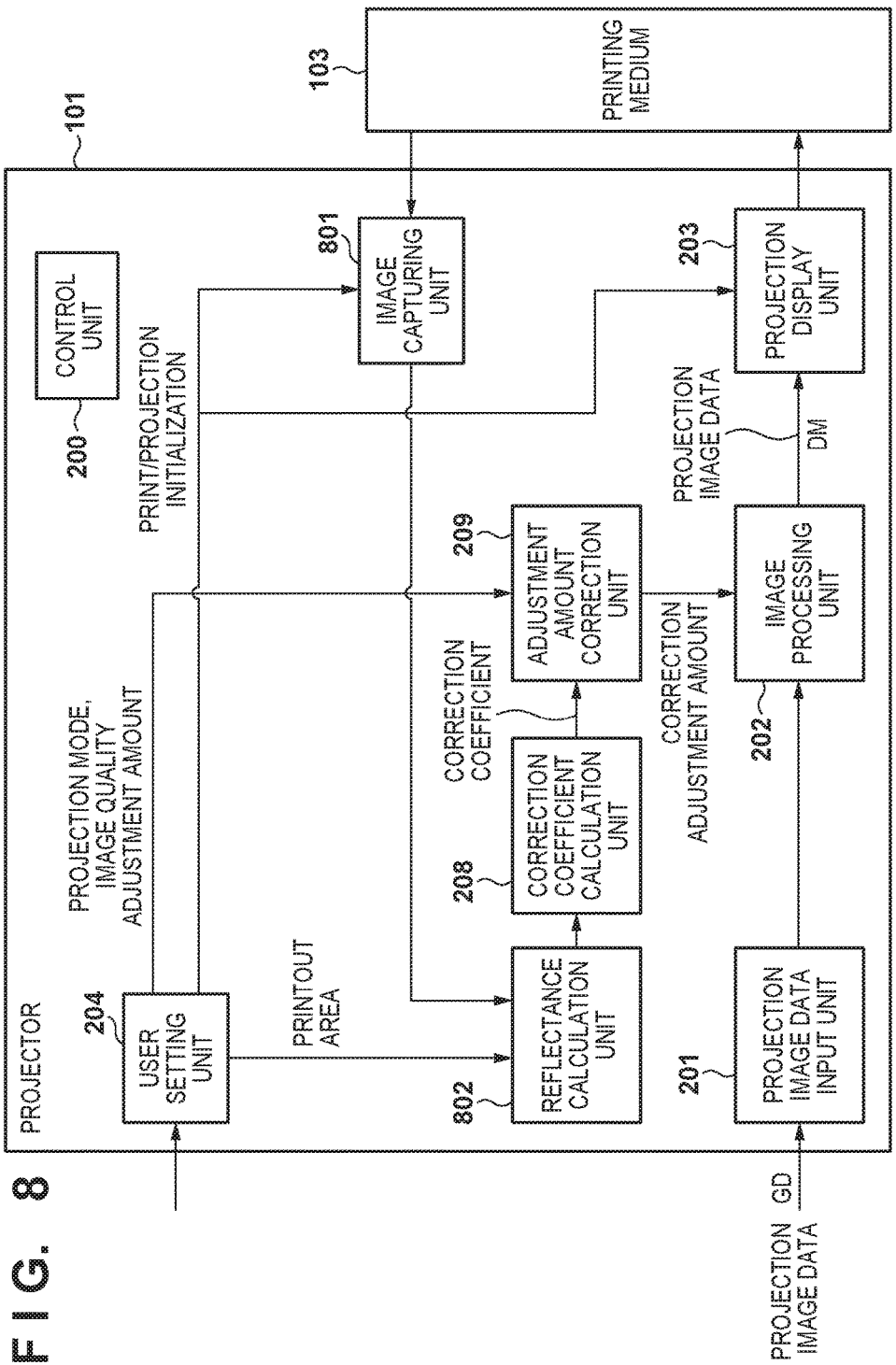

IMAGE PROCESSING APPARATUS, PROJECTION APPARATUS, IMAGE PROCESSING METHOD, PROJECTION METHOD, AND STORAGE MEDIUM

BACKGROUND OF THE INVENTION

Field of the Invention

The present invention relates to an image processing apparatus, a projection apparatus, an image processing method, a projection method, and a storage medium.

Description of the Related Art

Recent years have seen an increase in the number of opportunities in which images of subjects in the natural world that have been captured with a digital camera or the like are handled as high dynamic range images (HDR images), which have a high dynamic range. There is desire for HDR images to be reproduced faithfully to human vision, and the ability to faithfully reproduce HDR images leads to an increase in expressiveness in terms of color, tone, texture, and the like.

However, direct viewing devices such as liquid crystal displays and organic EL displays can generally reproduce a dynamic range of approximately 1 to 1000 $cd/m^2$. Accordingly, in the case where an HDR image with a dynamic range greater than 1000 $cd/m^2$ for example is to be displayed on such devices, it is necessary to perform tone compression processing called "tone mapping". In such a case, the original dynamic range of the HDR image cannot be expressed sufficiently.

In view of this, in order to expand the luminance dynamic range and color gamut, technology has been proposed for improving contrast by projecting images onto a printout (print image) with a projector (Japanese Patent Laid-Open No. 2007-334179). In contrast to technology for preventing the appearance of a projection image from changing due to the color of the screen (Japanese Patent Laid-Open No. 2004-274268), the technology disclosed in Japanese Patent Laid-Open No. 2007-334179 utilizes such a change in appearance in order to expand the luminance dynamic range and color gamut.

Also, there are projectors that include an image quality adjustment function for changing the brightness and colors of a projection image in accordance with a user instruction.

Unlike a screen, the light reflectance of a print image changes at different positions according to the image content. For this reason, if the user uses the image quality adjustment function of the projector to change the projection image that is to be projected on the print image, the change in appearance at the projection plane (print image) will change according to the position (i.e., according to the reflectance). However, in conventional technology, when changing a projection image in accordance with a user instruction, consideration has not been given to differences in reflectance according to the position on the print image. For this reason, it has been difficult to change the appearance of the projection image in accordance with the user's intentions (e.g., uniformly change the appearance of the projection image over the entirety of the print image, or change the appearance of the projection image so as to emphasize color differences in the print image).

SUMMARY OF THE INVENTION

The present invention was achieved in light of this situation, and provides technology for giving consideration to the reflectance at different positions on a print image printed on a printing medium when correcting a projection image that is to be projected and superimposed on the print image.

According to a first aspect of the present invention, there is provided an image processing apparatus that outputs projection image data to a projection unit configured to display an image by projecting a projection image onto a print image at a projection plane, the image processing apparatus comprising: a first acquisition unit configured to acquire image data; a second acquisition unit configured to acquire parameters related to reflectances at a plurality of positions on the print image; a setting unit configured to set an offset value for performing offset adjustment of at least one color of the image at the projection plane; and a correction unit configured to generate the projection image data by correcting a pixel value of a pixel in the image data based on the offset value and the parameter at a position in the print image that corresponds to the pixel.

According to a second aspect of the present invention, there is provided a projection apparatus that displays an image by projecting a projection image onto a print image at a projection plane, the projection apparatus comprising: a first acquisition unit configured to acquire image data; a second acquisition unit configured to acquire parameters related to reflectances at a plurality of positions on the print image; a setting unit configured to set an offset value for performing offset adjustment of at least one color of the image at the projection plane; a correction unit configured to generate projection image data by correcting a pixel value of a pixel in the image data based on the offset value and the parameter at a position in the print image that corresponds to the pixel; and a projection unit configured to project the projection image onto the print image based on the projection image data.

According to a third aspect of the present invention, there is provided an image processing apparatus that outputs projection image data to a projection unit configured to display an image by projecting a projection image at a projection plane, the image processing apparatus comprising: a first acquisition unit configured to acquire image data; a second acquisition unit configured to acquire first parameters related to reflectances at a plurality of positions in a region of the projection plane in which the projection image is to be projected; a setting unit configured to set a second parameter for allowing a user to perform adjustment of at least one color of the image at the projection plane; and a correction unit configured to generate the projection image data by correcting a pixel value of a pixel in the image data based on the second parameter and the first parameter at a position in the projection image that corresponds to the pixel.

According to a fourth aspect of the present invention, there is provided an image processing method executed by an image processing apparatus that outputs projection image data to a projection unit configured to display an image by projecting a projection image onto a print image at a projection plane, the image processing method comprising: acquiring image data; acquiring parameters related to reflectances at a plurality of positions on the print image; setting an offset value for performing offset adjustment of at least one color of the image at the projection plane; and generating the projection image data by correcting a pixel value of a pixel in the image data based on the offset value and the parameter at a position in the print image that corresponds to the pixel.

According to a fifth aspect of the present invention, there is provided a projection method executed by a projection apparatus that displays an image by projecting a projection image onto a print image at a projection plane, the projection method comprising: acquiring image data; acquiring parameters related to reflectances at a plurality of positions on the print image; setting an offset value for performing offset adjustment of at least one color of the image at the projection plane; generating projection image data by correcting a pixel value of a pixel in the image data based on the offset value and the parameter at a position in the print image that corresponds to the pixel; and projecting the projection image onto the print image based on the projection image data.

According to a sixth aspect of the present invention, there is provided an image processing method executed by an image processing apparatus that outputs projection image data to a projection unit configured to display an image by projecting a projection image at a projection plane, the image processing method comprising: acquiring image data; acquiring first parameters related to reflectances at a plurality of positions in a region of the projection plane in which the projection image is to be projected; setting a second parameter for allowing a user to perform adjustment of at least one color of the image at the projection plane; and generating the projection image data by correcting a pixel value of a pixel in the image data based on the second parameter and the first parameter at a position in the projection image that corresponds to the pixel.

According to a seventh aspect of the present invention, there is provided a non-transitory computer-readable storage medium which stores a program for causing a computer, of an image processing apparatus that outputs projection image data to a projection unit configured to display an image by projecting a projection image onto a print image at a projection plane, to execute an image processing method comprising: acquiring image data; acquiring parameters related to reflectances at a plurality of positions on the print image; setting an offset value for performing offset adjustment of at least one color of the image at the projection plane; and generating the projection image data by correcting a pixel value of a pixel in the image data based on the offset value and the parameter at a position in the print image that corresponds to the pixel.

According to an eighth aspect of the present invention, there is provided a non-transitory computer-readable storage medium which stores a program for causing a computer, of an image processing apparatus that outputs projection image data to a projection unit configured to display an image by projecting a projection image at a projection plane, to execute an image processing method comprising: acquiring image data; acquiring first parameters related to reflectances at a plurality of positions in a region of the projection plane in which the projection image is to be projected; setting a second parameter for allowing a user to perform adjustment of at least one color of the image at the projection plane; and generating the projection image data by correcting a pixel value of a pixel in the image data based on the second parameter and the first parameter at a position in the projection image that corresponds to the pixel.

Further features of the present invention will become apparent from the following description of exemplary embodiments with reference to the attached drawings.

BRIEF DESCRIPTION OF THE DRAWINGS

FIG. 5A shows an example of print image data PD.

FIG. 5B shows an example of projection image data GD.

FIG. 6 shows the values of various types of data that correspond to the examples in FIGS. 5A and 5B and are handled in the projector 101.

FIG. 8 is a block diagram showing a configuration of the projector 101 according to a second embodiment.

DESCRIPTION OF THE EMBODIMENTS

Hereinafter, embodiments of the present invention will be described with reference to the attached drawings. It should be noted that the technical scope of the present invention is defined by the claims, and is not limited by the following respective embodiments. Also, not all of the combinations of the aspects that are described in the embodiments are necessarily essential to the present invention. Also, the aspects that are described in the respective embodiments can be combined as appropriate.

First Embodiment

Figure 1:
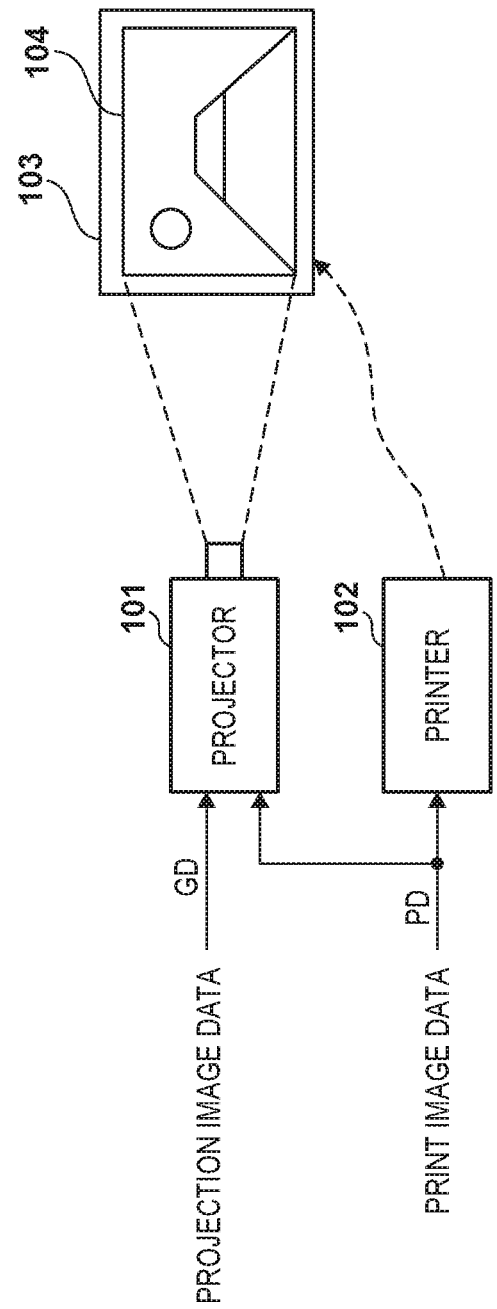
FIG. 1 shows a configuration of an image processing system.

FIG. 1 shows the configuration of an image processing system. In FIG. 1, a projector 101 performs image processing (described later) on projection image data GD based on print image data PD, and projects a projection image 104 based on the processed projection image data. In the following description, it is assumed that the projection image data GD and the print image data PD each have 8-bit (0 to 255) tones for each color.

A printer 102 prints an image on a printing medium 103 such as paper based on the print image data PD. The print image data PD is input to the printer 102 from an external device such as a PC or from a storage apparatus such as a USB memory. The printer 102 is a type of printer that prints inkjet photographs, for example.

The printing medium 103 is arranged at the projection plane of the projector 101 such that the position of a print image and the position of a projection image 104 match each other. Accordingly, the projector 101 displays the projection image 104 in a superimposed manner on the image (print image) printed on the printing medium 103. In other words, pixels at the same pixel positions in the projection image data GD and the print image data PD are superimposed on the printing medium 103. Accordingly, a user can view a high-contrast image.

Note that the projector 101 has two image projection modes, namely a "print image projection mode" (first projection mode) and a "PC mode" (second projection mode). The print image projection mode is a projection mode used when projecting an image so as to be superimposed on a print image. The PC mode is a projection mode used when projecting an image on an ordinary screen or the like.

Figure 2:
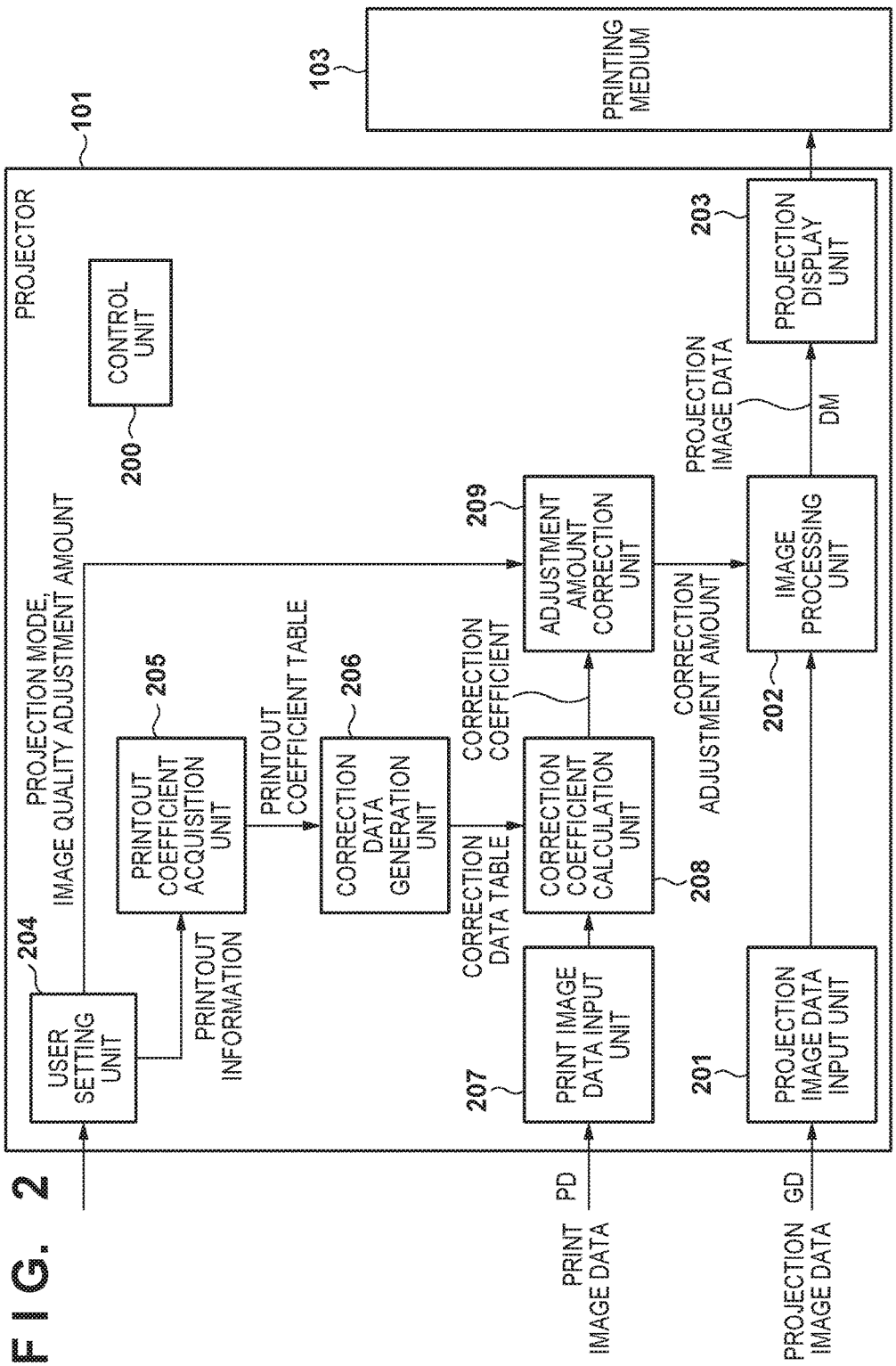
FIG. 2 is a block diagram showing a configuration of a projector 101 according to a first embodiment.

Next, specific functions of the projector 101 will be described with reference to FIG. 2. In FIG. 2, a control unit 200 includes a CPU, a ROM that stores a control program executed by the CPU, a RAM that is used as a work area for the CPU, and the like, and performs overall control of the projector 101. The functions of units of the projector 101 can be implemented by hardware, the control program, or a combination thereof.

A projection image data input unit 201 receives the projection image data GD from an external device such as a PC. The transmission method of the projection image data GD may be a transmission method compliant with a general-purpose video signal transmission standard, or may be a custom-defined transmission method. Examples of video signal transmission standards include HDMI (registered trademark) (High-Definition Multimedia Interface), DP (Display Port), and SDI (Serial Digital Interface).

An image processing unit 202 modifies the pixel values of the projection image data GD in accordance with later-described correction adjustment amounts, and inputs the result of the modification to a projection display unit 203 as the projection image data DM. Details of processing performed by the image processing unit 202 will be described later.

The projection display unit 203 has a light source such as a lamp or a laser, optical elements such as prisms and mirrors, a display panel such as a liquid crystal panel or an LCOS (Liquid Crystal On Silicon) panel, and a projection lens. The projection display unit 203 projects the projection image 104 onto the printing medium 103 based on the projection image data DM.

A user setting unit 204 acquires information related to image quality adjustment that is set by the user. For example, the projector 101 projects an OSD menu, the user performs menu operations using buttons included in the projector 101, and the content of the operations is input to the user setting unit 204. Alternatively, a configuration is possible in which an external device such as a tablet displays a menu, and the content of menu operations performed by the user is acquired by the user setting unit 204.

The information that is related to image quality adjustment and can be set by the user includes the projection mode, printout information (type of printing medium and type of color material), and image quality adjustment amounts (correction parameters). In the present embodiment, the image quality adjustment amounts include three types of offsets, namely a red (R) offset, a green (G) offset, and a blue (B) offset, and each of these offsets can be set to a value (correction value) in the range of −32 to +32. The user setting unit 204 outputs the printout information to a printout coefficient acquisition unit 205, and outputs the projection mode and the image quality adjustment amounts to an adjustment amount correction unit 209.

The printout coefficient acquisition unit 205 acquires a printout coefficient table related to reflectance characteristics based on the printout information that is input from the user setting unit 204. The printout coefficients represent the red (R) light reflectance, the green (G) light reflectance, and the blue (B) light reflectance of the projector 101, which correspond to the colors of the print image.

Figures 3, 4:
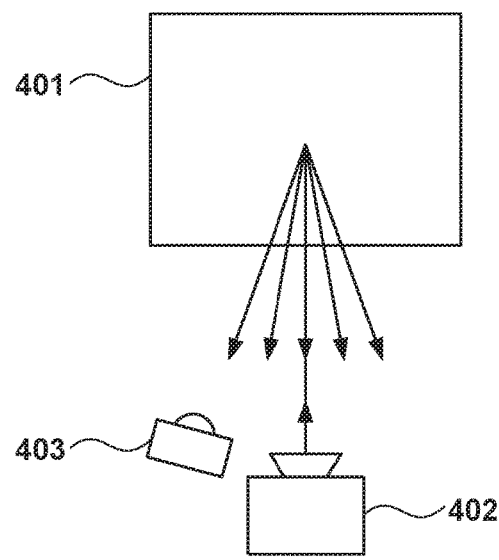
FIG. 3 shows an example of a printout coefficient table.
FIG. 4 is a diagram illustrating a printout coefficient measurement method.

FIG. 3 shows an example of the printout coefficient table. The printout coefficients are different for respective colors of the print image, and therefore the printout coefficient table includes printout coefficients for each of the colors in the print image data PD. In other words, the printout coefficient table includes pixel values of the print image data PD and reflectances in association with each other. Also, the printout coefficients are different depending on the type of printing medium (paper or the like) and the type of color material (ink, toner, or the like), and therefore the printout coefficient acquisition unit 205 stores multiple printout coefficient tables that correspond to various combinations of types of printing media and color materials. Values obtained by measurement performed in advance are used as the printout coefficients that correspond to the various combinations. The types of printing media include plain paper, matte paper, glossy paper, and the like, and the types of color materials include pigment ink, dye ink, and the like. If the precision required for the reflectance is not very high, it is possible to give consideration to only the type of printing medium or the type of color material. Note that the printout coefficients are also different depending on the type of light source of the projector 101, and therefore if the light source of the projector 101 is interchangeable, printout coefficient tables that correspond to various combinations of types of printing media, color materials, and light sources are prepared.

The following describes a printout coefficient measurement method with reference to FIG. 4. The ambient light at the time of measurement is determined with consideration given to the ambient light at the time of use of the projector 101. A printing medium 401 with an image of a specific color printed thereon is arranged at a certain position, light is projected from the light source 402 onto the printing medium 401, and reflected light is measured by a luminance meter 403. The light source 402 is a light source that has the same spectral characteristics as the red (R), green (G), and blue (B) light projected by the projector 101, and can project R, G, and B light independently.

Theoretically, the printout coefficient represents the ratio of luminance of a print image under the same conditions, with 1 being the luminance when light strikes a reference white board (complete diffusion board). The luminance is measured by projecting red (R), green (G), and blue (B) light while changing the color of the print image, and the obtained values (ratios) are stored in a storage unit of the printout coefficient acquisition unit 205 in a table format as shown in FIG. 3.

The printout coefficient acquisition unit 205 selects one printout coefficient table that corresponds to the printout information, and inputs it to a correction data generation unit 206.

The correction data generation unit 206 generates a correction data table based on the printout coefficient table. In the present embodiment, the correction data table is the inverse of the values of the printout coefficient table. The correction data generation unit 206 inputs the correction data table to a correction coefficient calculation unit 208.

A print image data input unit 207 receives the print image data PD from an external device such as a PC or a storage apparatus such as a USB memory. The print image data input unit 207 inputs the received print image data PD to the correction coefficient calculation unit 208.

The correction coefficient calculation unit 208 references the correction data table and the print image data PD, and calculates correction coefficients for pixel positions in the projection image data GD. The correction coefficient calculation unit 208 specifies pixel values in the print image data PD at positions where pixels in the projection image data GD are superimposed on the print image, and uses the values in the correction data table that correspond to the specified pixel values as the correction coefficients. If the same value as the specified pixel value is not included in the correction data table, the correction coefficient calculation unit 208 calculates a correction coefficient for the specified pixel value by appropriate interpolation processing such as linear interpolation. The correction coefficient calculation unit 208 inputs the correction coefficients for the pixel positions in the projection image data GD to the adjustment amount correction unit 209.

Note that in the present embodiment, the pixel positions in the print image data PD and the projection image data GD are in one-to-one correspondence, and therefore the correction coefficient calculation unit 208 need only reference the pixel value in the print image data PD that is at the same pixel position in the projection image data GD. If the pixel positions are not in one-to-one correspondence, the correction coefficient calculation unit 208 changes the resolution of the print image data PD using a bilinear method or a bicubic method such that the pixel positions in the print image data PD and the projection image data GD are in one-to-one correspondence.

If the projection mode is the print image projection mode, the adjustment amount correction unit 209 corrects the image quality adjustment amounts based on the correction coefficients, and generates a corrected image quality adjustment amount (correction adjustment amount) for each pixel position. In other words, if the print image projection mode has been set, the projection image data GD is corrected based on both the image quality adjustment amounts set by the user and the reflectance of the print image. The adjustment amount correction unit 209 inputs the correction adjustment amounts to the image processing unit 202.

More specifically, if the projection mode is the print image projection mode, for each pixel position, the adjustment amount correction unit 209 multiplies the correction coefficient that corresponds to the pixel position by the image quality adjustment amount. The correction adjustment amount calculation equations are shown in Expression 1 below. In Expression 1, ADJ represents the correction adjustment amount, Rofs represents the R offset value, Gofs represents the G offset value, Bofs represents the B offset value, and IR represents the correction coefficient. Also, x,y in ADJ(x,y,r/g/b) and IR(x,y,r/g/b) represents the pixel position, and r/g/b corresponds to R, G, and B in the projection image data GD.

$$ADJ(x,y,r) = Rofs \times IR(x,y,r)$$

$$ADJ(x,y,g) = Gofs \times IR(x,y,g)$$

$$ADJ(x,y,b) = Bofs \times IR(x,y,b) \quad (1)$$

If the projection mode is the PC mode, the adjustment amount correction unit 209 outputs the image quality adjustment amounts as they are as the correction adjustment amounts. In other words, in this case, image quality adjustment amount correction is not performed. Specifically, if the PC mode has been set, the projection image data GD is corrected based on the image quality adjustment amounts set by the user, and without using the reflectance of the print image.

Next, details of the processing performed by the previously-mentioned image processing unit 202 will be described. The image processing unit 202 calculates the projection image data DM by adding the correction adjustment amounts ADJ to the projection image data GD. The projection image data DM calculation equations are shown in Expression 2 below.

$$DM(x,y,r) = GD(x,y,r) + ADJ(x,y,r)$$

$$DM(x,y,g) = GD(x,y,g) + ADJ(x,y,g)$$

$$DM(x,y,b) = GD(x,y,b) + ADJ(x,y,b) \quad (2)$$

Next, a specific example of operations of the projector 101 will be described with reference to FIGS. 5A to 7. FIG. 5A shows an example of the print image data PD, and FIG. 5B shows an example of the projection image data GD. In these figures, P1 and G1, P2 and G2, P3 and G3 represent corresponding pixel positions in the print image data PD and the projection image data GD. Also, a tree (near P1 and G1) and a person (near P2 and G2) are the same design in the print image data PD and the projection image data GD. The sun (near G3) design exists in only the projection image data GD. In this way, the print image data PD and the projection image data GD are not necessarily required to be completely the same image. It is possible to separately provide projection image data GD that has a moon design instead of the sun design near G3, and to dynamically change the image viewed by the user on the printing medium 103 by switching between these two pieces of projection image data GD.

FIG. 6 shows the values of various types of data that correspond to the examples in FIGS. 5A and 5B and are handled in the projector 101. The print image data PD in FIG. 5A and the projection image data GD in FIG. 5B are input to the projector 101. The pixel value at P1 to P3 at this time are the values shown in the row indicated by "print image data PD" in FIG. 6. Also, the pixel values at G1 to G3 are the values shown in the row indicated by "projection image data GD" in FIG. 6.

Figure 7:
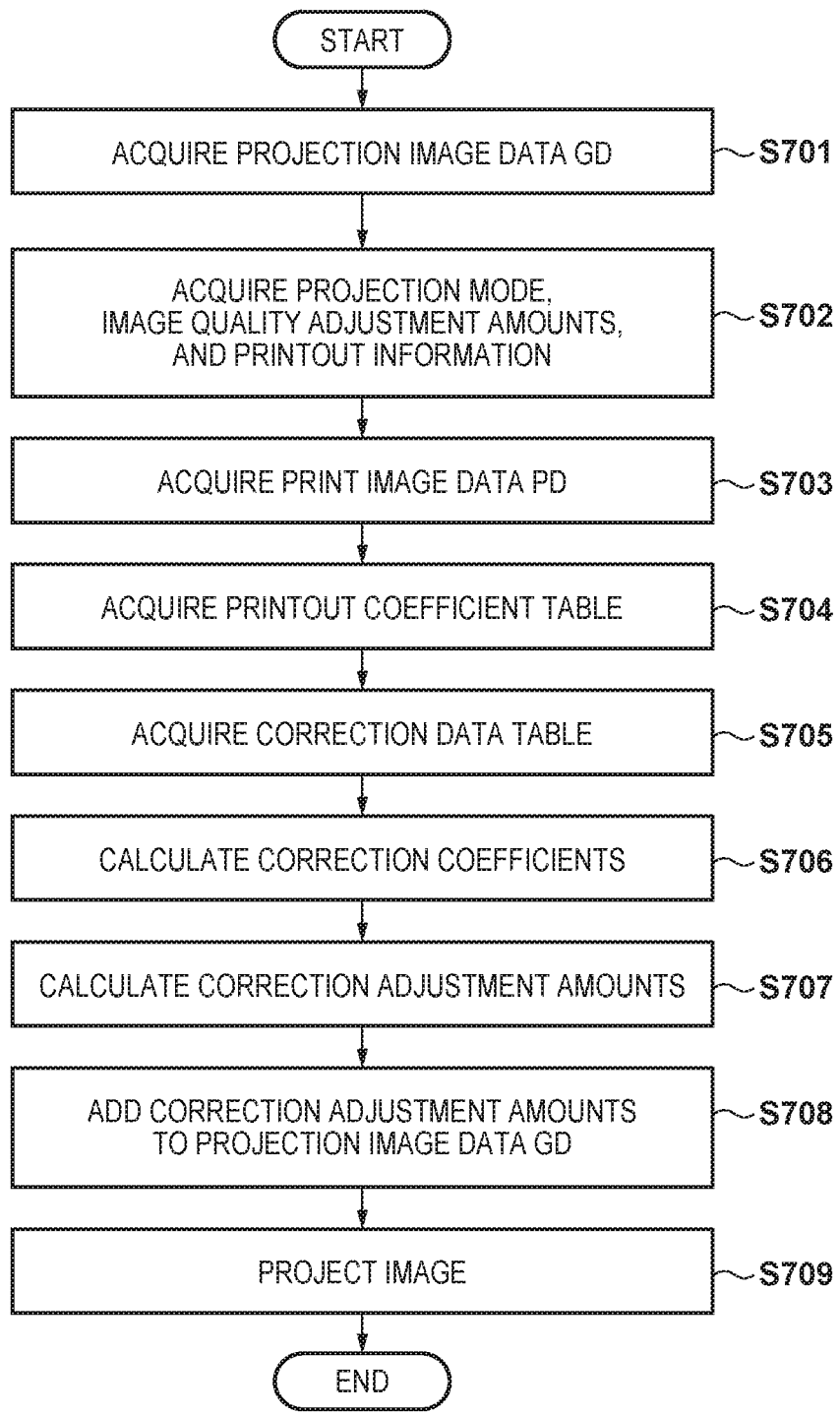
FIG. 7 is a flowchart of image processing and projection processing executed by the projector 101.

FIG. 7 is a flowchart of image processing and projection processing executed by the projector 101. In step S701, the projection image data input unit 201 acquires the projection image data GD. In step S702, the user setting unit 204 acquires the projection mode, the image quality adjustment amount, and the printout information set by the user. Here, it is assumed that the projection mode is the print image projection mode, the type of printing medium is plain paper, the type of color material is dye ink, the R offset is 0, the G offset is 0, and the B offset is +20. In step S703, the print image data input unit 207 acquires the print image data PD.

In step S704, the printout coefficient acquisition unit 205 acquires the printout coefficient table that corresponds to the combination of plain paper and dye ink from among the printout coefficient tables that are stored in advance, and inputs the acquired printout coefficient table to the correction data generation unit 206. Among the values in the acquired printout coefficient table, the printout coefficients that correspond to the pixel values at P to P3 are shown in the row indicated by "printout coefficient" in FIG. 6.

In step S705, the correction data generation unit 206 uses the inverse of the values of the printout coefficient table as the correction data table. In step S706, the correction coefficient calculation unit 208 calculates correction coefficients for the pixel positions in the projection image data GD based on the correction data table. The values (correction coefficients) in the correction data table that correspond to G1 to G3 are shown in the row indicated by "correction coefficient" in FIG. 6.

In step S707, the adjustment amount correction unit 209 calculates correction adjustment amounts by multiplying the correction coefficients of the pixel positions by the R offset (0), the G offset (0), and the B offset (+20), which are the image quality adjustment amounts. The correction adjustment amounts that correspond to G1 to G3 are shown in the row indicated by "correction adjustment amount" in FIG. 6.

In step S708, the image processing unit 202 obtains the projection image data DM by adding the correction adjustment amounts to the projection image data GD. The pixel values at G1 to G3 in the projection image data DM are shown in the row indicated by "projection image data DM" in FIG. 6. In step S709, the projection display unit 203 projects the projection image 104 onto the printing medium 103 based on the projection image data DM.

In this way, the B offset, which is +20 in the above example, becomes a value that is extended for each pixel by the inverse of the reflectance of the printout, and is added to the pixels of the projection image data GD. Also, the light projected onto the printing medium 103 is reflected in accordance with the reflectance of the printout, and the appearance at the projection plane (on the printing medium) changes such that +20 is uniformly added to the B values.

As described above, according to the first embodiment, the projector 101 acquires the reflectance at multiple positions on the print image printed on the printing medium based on corresponding pixel values in the print image data. The projector 101 then corrects the pixel values in the projection image data that correspond to the positions on the print image based on the image quality adjustment amounts set by the user and the reflectances at the corresponding positions on the print image.

In this way, according to the present embodiment, it is possible to give consideration to the reflectance at different positions on a print image printed on a printing medium when correcting a projection image that is to be projected and superimposed on the print image.

Also, as a specific example regarding the consideration given to reflectance, the projector 101 can multiply the image quality adjustment amounts set by the user by the inverse of the reflectance. According to this configuration, the user can easily change the appearance of the projection image uniformly over the entirety of the print image.

Note that instead of the inverse of the reflectance, the projector 101 may multiply the image quality adjustment amounts by a value that has an approximately negative correlation with the reflectance. Even in this case, it is possible to suppress, to a certain extent, variation according to the position in the projection image, which occurs in the change in the projection image attributed to the correction of the projection image data.

Also, although the example of using RGB offsets in image quality adjustment is described in the present embodiment, the present embodiment is not limited to this. For example, in the case of intermediate colors such as magenta, cyan, and yellow, the user setting unit 204 acquires a magenta offset, a cyan offset, and a yellow offset as the image quality adjustment amounts. The user setting unit 204 then separates the magenta, cyan, and yellow colors into RGB components, and performs conversion into an R offset, a G offset, and a B offset. In the case of performing brightness adjustment, the user setting unit 204 acquires a brightness offset as an image quality adjustment amount. The user setting unit 204 uses the value of the brightness offset as-is as the values of the R offset, the G offset, and the B offset.

Also, although the case of projecting an image on a printout printed by a printer is described in the present embodiment, the principles of the present embodiment are also applicable to the case of projecting an image on a painting such as an oil painting or a watercolor painting, or a three-dimensional object such as a sculpture or a building. In such a case, the print image data input unit 207 acquires an actual image that has been captured in advance in place of the print image data. The printout coefficient acquisition unit 205 stores in advance a printout coefficient table that is obtained by measuring in advance the reflectance for combinations of materials, and acquires the reflectance based on the printout coefficient table.

Second Embodiment

The first embodiment describes a configuration in which the reflectance, the correction coefficients, and the like are calculated based on the print image data PD. A second embodiment describes a configuration in which the reflectance, the correction coefficients, and the like are calculated based on an image of the printout that has been captured by an image capturing unit such as a digital camera built into the projector.

FIG. 8 is a block diagram showing the configuration of the projector 101 according to the second embodiment. In FIG. 8, the same reference signs as in FIG. 2 have been given to blocks with functions that are the same as or similar to those in FIG. 2. The following mainly describes differences from the first embodiment.

The user setting unit 204 acquires the projection mode, the image quality adjustment amounts, a printout area, and a print/projection initialization instruction that have been set by a user. In the present embodiment, the printout area is a paper size (A0 to A4). The user setting unit 204 sets the printout area in a reflectance calculation unit 802. Also, upon receiving the print/projection initialization instruction, the user setting unit 204 instructs the projection display unit 203 and an image capturing unit 801 to perform initialization.

Upon receiving the initialization instruction, the projection display unit 203 projects an all-white image for a certain time instead of a projection image that is based on the projection image data DM.

Upon receiving the initialization instruction, the image capturing unit 801 captures images of the printout during the period in which the projection display unit 203 projects the all-white image. The image capturing unit 801 inputs RGB data (captured image data) obtained from the captured print image to the reflectance calculation unit 802.

With use of the captured image data and reference RGB data, the reflectance calculation unit 802 calculates reflectances that correspond to pixels in the captured image data. The reference RGB data is RGB data that is obtained by the image capturing unit 801 capturing images while an all-white image is projected onto an A0-sized reference white board by the projector 101. The reference RGB data is obtained by image capturing that is performed in advance, and is stored in the reflectance calculation unit 802. Also, the luminance of the display surface changes according to the projection area, and therefore the reflectance calculation unit 802 also performs correction with use of the printout area when performing the reflectance calculation. The reflectance calculation equations are shown in Expression 3 below $$R \text{ reflectance}(x,y) = \text{input } R(x,y)/\text{area coefficient/reference } R$$

$$G \text{ reflectance}(x,y) = \text{input } G(x,y)/\text{area coefficient/reference } G$$

$$B \text{ reflectance}(x,y) = \text{input } B(x,y)/\text{area coefficient/reference } B \quad (3)$$

Here, the R/G/B reflectance(x,y) represents the reflectance of the R/G/B component that corresponds to the pixel position (x,y) in the captured image data. The input R/G/B (x,y) represents the value of the R/G/B component that corresponds to the pixel position (x,y) in the captured image data. The reference R/G/B represents the value of the R/G/B component in the reference RGB data. Also, because the A0 size is used as the reference in the present embodiment, the area coefficient is 1 in the case where the printout area is A0, 2 in the case where the printout area is A1, 4 in the case where the printout area is A2, 8 in the case where the printout area is A3, and 16 in the case where the printout area is A4.

The correction coefficient calculation unit 208 references the print image data PD and the reflectances that correspond to the pixels in the captured image data calculated by the reflectance calculation unit 802, and calculates correction coefficients for the pixel positions in the projection image data GD. The reflectances that correspond to the pixels in the captured image data are equivalent to the reflectances at positions in the print image that correspond to the pixels in the captured image data. Accordingly, the correction coefficient calculation unit 208 specifies the pixel positions in the captured image data that correspond to positions where pixels in the projection image data GD are superimposed on the print image, and uses the inverse of the reflectances that correspond to the specified pixel positions as the correction coefficients. The correction coefficient calculation unit 208 inputs the correction coefficients for the pixel positions in the projection image data GD to the adjustment amount correction unit 209. The subsequent processing is similar to that in the first embodiment.

As described above, according to the second embodiment, the projector 101 acquires the reflectance at multiple positions on the print image printed on the printing medium based on captured image data obtained from the print image. Accordingly, even if the print image data PD is not available to the projector 101, similarly to the first embodiment, consideration can be given to the reflectance at various positions in the print image printed on the printing medium when correcting the projection image that is to be projected so as to be superimposed on the print image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-122473, filed Jun. 22, 2017 which is hereby incorporated by reference herein in its entirety.

What is claimed is:

1. An image processing apparatus that outputs projection image data to a projection unit configured to display an image by projecting a projection image onto a print image at a projection plane, the image processing apparatus comprising:
   a first acquisition unit configured to acquire image data;
   a second acquisition unit configured to acquire parameters related to reflectances at a plurality of positions on the print image;
   a setting unit configured to set an offset value for performing offset adjustment of at least one color of the image at the projection plane; and
   a correction unit configured to generate the projection image data by correcting a pixel value of a pixel in the image data based on the offset value and the parameter at a position in the print image that corresponds to the pixel.

2. The image processing apparatus according to claim 1, wherein the correction unit corrects the pixel value of the pixel in the image data with use of a value obtained by multiplying the offset value by an inverse of a reflectance at the position in the print image that corresponds to the pixel.

3. The image processing apparatus according to claim 1, further comprising:
   a third acquisition unit configured to acquire print image data for printing the print image,
   wherein the second acquisition unit acquires the parameters related to the reflectances at the plurality of positions in the print image based on pixel values of pixels in the print image data that correspond to the plurality of positions in the print image.

4. The image processing apparatus according to claim 3, further comprising:
   a storage unit configured to store a table in which pixel values of the print image data and reflectances of the print image are associated with each other,
   wherein the second acquisition unit acquires, by referencing the table, the reflectances at the plurality of positions in the print image based on the pixel values of the pixels in the print image data that correspond to the plurality of positions in the print image.

5. The image processing apparatus according to claim 3, wherein the first acquisition unit further acquires at least one of a type of color material of the print image and a type of printing medium on which the print image is printed, and
   the second acquisition unit acquires the parameters related to the reflectances at the plurality of positions in the print image based on the print image data and the at least one of the type of color material of the print image and the type of printing medium.

6. The image processing apparatus according to claim 1, further comprising:
   an image capturing unit,
   wherein the second acquisition unit acquires the reflectances at the plurality of positions in the print image based on captured image data obtained by the image capturing unit capturing an image of the print image.

7. The image processing apparatus according to claim 1, further comprising:
   a mode setting unit configured to set one of a plurality of correction modes including a first correction mode of correcting the image data based on the offset value and the parameters and a second correction mode of correcting the image data based on the offset value and without using the parameters, wherein the correction unit corrects the image data based on the set correction mode.

8. A projection apparatus that displays an image by projecting a projection image onto a print image at a projection plane, the projection apparatus comprising:

a first acquisition unit configured to acquire image data;

a second acquisition unit configured to acquire parameters related to reflectances at a plurality of positions on the print image;

a setting unit configured to set an offset value for performing offset adjustment of at least one color of the image at the projection plane;

a correction unit configured to generate projection image data by correcting a pixel value of a pixel in the image data based on the offset value and the parameter at a position in the print image that corresponds to the pixel; and a projection unit configured to project the projection image onto the print image based on the projection image data.

9. An image processing apparatus that outputs projection image data to a projection unit configured to display an image by projecting a projection image at a projection plane, the image processing apparatus comprising:

a first acquisition unit configured to acquire image data;

a second acquisition unit configured to acquire first parameters related to reflectances at a plurality of positions in a region of the projection plane in which the projection image is to be projected;

a setting unit configured to set a second parameter for allowing a user to perform adjustment of at least one color of the image at the projection plane; and a correction unit configured to generate the projection image data by correcting a pixel value of a pixel in the image data based on the second parameter and the first parameter at a position in the projection image that corresponds to the pixel.

10. An image processing method executed by an image processing apparatus that outputs projection image data to a projection unit configured to display an image by projecting a projection image onto a print image at a projection plane, the image processing method comprising:

acquiring image data;

acquiring parameters related to reflectances at a plurality of positions on the print image;

setting an offset value for performing offset adjustment of at least one color of the image at the projection plane; and generating the projection image data by correcting a pixel value of a pixel in the image data based on the offset value and the parameter at a position in the print image that corresponds to the pixel.

11. The image processing method according to claim 10, wherein the generating includes correcting the pixel value of the pixel in the image data with use of a value obtained by multiplying the offset value by an inverse of a reflectance at the position in the print image that corresponds to the pixel.

12. The image processing method according to claim 10, further comprising:

acquiring print image data for printing the print image, wherein the acquiring of the parameters includes acquiring the parameters related to the reflectances at the plurality of positions in the print image based on pixel values of pixels in the print image data that correspond to the plurality of positions in the print image.

13. The image processing method according to claim 12, wherein the acquiring of the parameters includes acquiring, by referencing a table in which pixel values of the print image data and reflectances of the print image are associated with each other, the reflectances at the plurality of positions in the print image based on the pixel values of the pixels in the print image data that correspond to the plurality of positions in the print image.

14. The image processing method according to claim 12, wherein the acquiring of the image data includes further acquiring at least one of a type of color material of the print image and a type of printing medium on which the print image is printed, and the acquiring of the parameters includes acquiring the parameters related to the reflectances at the plurality of positions in the print image based on the print image data and the at least one of the type of color material of the print image and the type of printing medium.

15. The image processing method according to claim 10, wherein the acquiring of the parameters includes acquiring the reflectances at the plurality of positions in the print image based on captured image data obtained by an image capturing unit capturing an image of the print image.

16. The image processing method according to claim 10, further comprising:

setting one of a plurality of correction modes including a first correction mode of correcting the image data based on the offset value and the parameters and a second correction mode of correcting the image data based on the offset value and without using the parameters, wherein the generating includes correcting the image data based on the set correction mode.

17. A projection method executed by a projection apparatus that displays an image by projecting a projection image onto a print image at a projection plane, the projection method comprising:

acquiring image data;

acquiring parameters related to reflectances at a plurality of positions on the print image;

setting an offset value for performing offset adjustment of at least one color of the image at the projection plane;

generating projection image data by correcting a pixel value of a pixel in the image data based on the offset value and the parameter at a position in the print image that corresponds to the pixel; and projecting the projection image onto the print image based on the projection image data.

18. An image processing method executed by an image processing apparatus that outputs projection image data to a projection unit configured to display an image by projecting a projection image at a projection plane, the image processing method comprising:

acquiring image data;

acquiring first parameters related to reflectances at a plurality of positions in a region of the projection plane in which the projection image is to be projected;

setting a second parameter for allowing a user to perform adjustment of at least one color of the image at the projection plane; and generating the projection image data by correcting a pixel value of a pixel in the image data based on the second parameter and the first parameter at a position in the projection image that corresponds to the pixel.

19. A non-transitory computer-readable storage medium which stores a program for causing a computer, of an image processing apparatus that outputs projection image data to a projection unit configured to display an image by projecting a projection image onto a print image at a projection plane, to execute an image processing method comprising:
- acquiring image data;
- acquiring parameters related to reflectances at a plurality of positions on the print image;
- setting an offset value for performing offset adjustment of at least one color of the image at the projection plane; and
- generating the projection image data by correcting a pixel value of a pixel in the image data based on the offset value and the parameter at a position in the print image that corresponds to the pixel.

20. A non-transitory computer-readable storage medium which stores a program for causing a computer, of an image processing apparatus that outputs projection image data to a projection unit configured to display an image by projecting a projection image at a projection plane, to execute an image processing method comprising:
- acquiring image data;
- acquiring first parameters related to reflectances at a plurality of positions in a region of the projection plane in which the projection image is to be projected;
- setting a second parameter for allowing a user to perform adjustment of at least one color of the image at the projection plane; and
- generating the projection image data by correcting a pixel value of a pixel in the image data based on the second parameter and the first parameter at a position in the projection image that corresponds to the pixel.

* * * * *